Jan. 26, 1965
C. HUETTEN
3,166,858
EDUCATIONAL DEVICE
Original Filed April 25, 1960
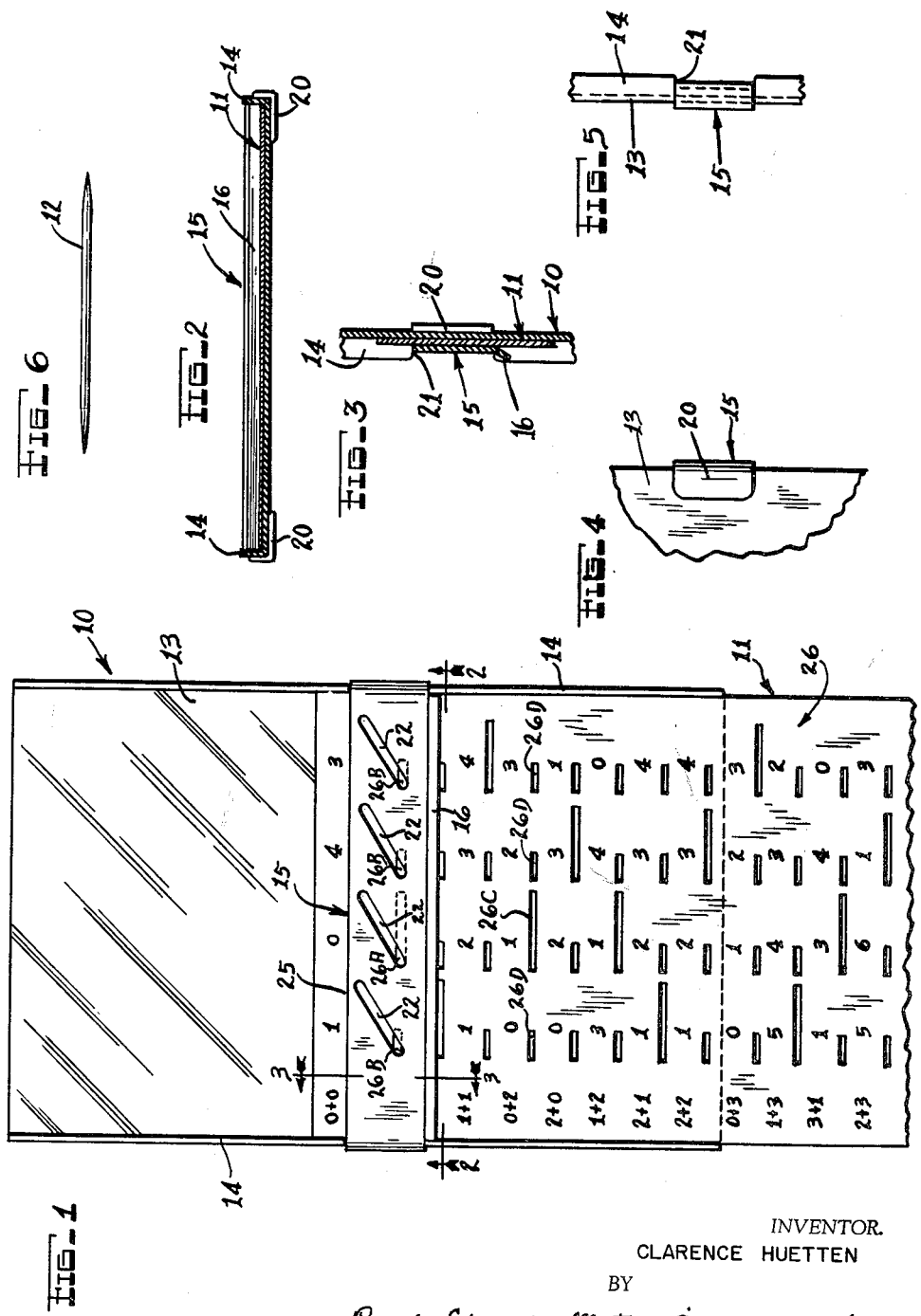
INVENTOR.
CLARENCE HUETTEN
BY
Pennie, Edmonds, Morton, Barrows, and Taylor
ATTORNEYS

United States Patent Office 3,166,858
Patented Jan. 26, 1965

3,166,858
EDUCATIONAL DEVICE
Clarence Huetten, 511 N. Bolton, Indianapolis 19, Ind.
Continuation of application Ser. No. 24,377, Apr. 25, 1960. This application May 3, 1962, Ser. No. 192,175
6 Claims. (Cl. 35—9)

The present invention relates to an educational device.

The present application is a continuation of my pending application for Educational Device, Serial No. 24,377, filed April 25, 1960, now abandoned.

One of the problems present in present day group teaching is the fact that different individuals learn at different rates. In other words, the material being taught is generally too slow for the fast, too fast for the slow and not optimum for any individual. Even in individual tutoring, the knowledge being taught may be at a level too advanced or at too great a rate and may result in distorted or erroneous understanding.

These problems could be answered to a large extent if the material were carefully prepared by professional people and presented in a step by step fashion where each step is a small logical extension of previous knowledge of the student. For this procedure to be effective, the student must have a continuous check on his understanding while the material is being presented, and he must be able to proceed at his maximum individual rate.

Therefore, one object of the present invention is to provide an educational device which permits a step by step presentation of material and a simultaneous check on comprehension.

A further object of the invention is to provide an educational device which speeds up teaching and yet allows each student to move at his own rate for each problem presented.

A further object of the invention is to provide an improved educational device.

Related objects and advantages will become apparent as the description proceeds.

In accordance with the present invention, there is provided a set of cards and a housing for the cards. Each card is movable or slidable back and forth within the housing and carries a plurality of multiple choice problems. The housing is proportioned to indicate or present a given problem and to hide further problems which may be of increasing difficulty and require a knowledge of the answers to previous problems. An important feature of the present device is that it includes means for moving a further problem into view, said means being actuated by the selection of a correct answer to a previous problem.

The full nature of the invention will be understood from the accompanying drawings and the following description and claims:

FIG. 1 is a plan view of a representative card and a card viewer forming one embodiment of the present invention.

FIG. 2 is a sectional view taken along the line 2—2 of FIG. 1 in the direction of the arrows.

FIG. 3 is a sectional view taken along the line 3—3 in the direction of the arrows.

FIG. 4 is a fragmentary plan view of the bottom or back of the card viewer of FIG. 1.

FIG. 5 is a fragmentary side view of the card viewer of FIG. 1.

FIG. 6 is a side view of a pointer which is used in operating the educational device of the present invention.

Referring now to the drawings, this invention comprises a card viewer or housing, indicated generally by the numeral 10, a plurality of problem cards, one of which is indicated generally by the numeral 11 and a pointer 12 (FIG. 6). In its left-hand column, the problem card 11 carries a plurality of problems, the first one of which, for example, is the sum of 0+0. Spaced transversely across the problem card are possible answers to each of the problems in the first column. For example, the possible answers to the sum of 0+0 are 1, 0, 4 and 3.

The card viewer includes a plate 13 which has upturned longitudinal edge portions or flanges 14 providing guide means for the card 11. It can be seen that the card 11 has a transverse dimension substantially equal to the distance between the upturned edge portions 14 and thus, as the card moves through the viewer, it will not become canted or tilted. A transverse member 15 is located centrally of the device and is mounted upon the plate 13 in spaced relation to the flat central portion thereof so as to allow passage of the card 11 between the members 13 and 15. The transverse member 15 has a longitudinal edge portion 16 which is bent away from the member 13 and provides a guide facilitating insertion of a card beneath the transverse member.

The transverse member is secured to the plate 13 by end portions 20 which lie within indentations 21 in the flanges 14 and are bent around the plate 13. The transverse member 15 is provided with a plurality of slots 22 which extend diagonally or obliquely with relation to the direction of the movement of the card 11 within the viewer. The transverse member 15 is provided with a straight upper edge 25 which indicates or presents (underlines) the problem on the card which is next above the edge 25. The transverse member 15 hides and obscures the problems next below or following the indicated problem.

Each of the slots 22 is positioned in the member 15 adjacent the edge 25 and just below a respective one of the answers to the indicated problem. The card 11 is provided with a plurality 26 of transversely extending slots, some of which are shorter than others thereof. Each of the transversely extending slots corresponds to a respective one of the answers to the problems on the card. For example, the slot 26A is longer than the slots 26B and corresponds to the correct answer to the problem 0+0 while slots 26B correspond to the incorrect answers 1, 4 and 3.

In order to operate the device, the student places the pointer 12 in the lower leftward end of the slot 22 below what he believes to be is the correct answer to the problem in the leftward column of the card. The slots 26 are so located in the card that, when the problem to which each slot corresponds is presented above the transverse member 15, the leftward ends of those slots 26 are in registry with the leftward ends of the slots 22 in the transverse member. Thus, when the student inserts the pointer in the leftward end of one of the slots, the pointer is also inserted in the registering one of the plurality 26 of slots.

It should be noted that all of the slots 22 and the registering ones of slots 26 appear identical and there is no hint or tip-off to the student as to which slot is the long one and which answer is the correct one. Next, the student moves the pointer as far upwardly and rightwardly as it will go along the slot 22 within which he has inserted the pointer. If he has selected, for example, the slot 22 below the correct answer "0," the pointer will move to the upper rightward end of the slot 22 and the next problem below the problem 0+0 will be presented.

This effect will occur because the lower edge of the slot 22 will cam against the pointer and the pointer will cam against the upper edge of the slot 26A so that by the time the pointer has completed its movement from one end of the slot 22 to the other, the slot 26A will have its rightward end in registry with the upper rightward end of the slot 22. It can be seen that each of the slots 26 which corresponds to the correct answer has a length equal to the lateral projection of each slot 22. It can also be seen that each of the slots 22 has a sufficient length and angle so that the card will be moved to the next problem by the action of moving the pointer from one end to the other of the correct slot 22. Furthermore, when the card is so moved, the various slots and problems are so proportioned and arranged that the leftward ends of the slots 26 corresponding to the answers to the new problem should be in registry with the leftward ends of the slots 22.

Assuming now that the student selects the wrong answer to the problem and, for example, selects one of the answers 1, 4 or 3 to the problem 0+0, he will place his pointer within the lower leftward end of the slot 22 corresponding to the incorrect answer which he has selected and will attempt to move the pointer through the slot to its upper rightward end. When the pointer is inserted within the slot 22, it will also be inserted into the registering slot 26B. Because of the fact that the slots 26B are much shorter than the slot 26A, the card will not move upwardly to any appreciable extent and the student will know that he has selected an incorrect answer because the next problem has not been presented.

It can be seen that the remaining ones of the plurality 26 of slots are arranged in like manner to the slots 26A and 26B. For example, the slots 26C is longer than the slots 26D because it corresponds to the correct answer "2" to the problem 1+1 while the slots 26D correspond to the incorrect answers 1, 3 and 4. It can also be seen that the length of the slot 26C corresponds to the lateral projection of the slots 22 and that the length of the slots 26D is sufficiently short to prevent the card from being moved upwardly any appreciable extent when acted upon by the pointer 12.

It should be understood that the present invention is not restricted to numbers or mathematical problems. The following examples give samples of the possibilities of this invention:

One row from a card for a primary grade student may look as follows:

| cat | Picture of a dog | Picture of a cat | Picture of a rat | Picture of a horse |
|---|---|---|---|---|

One row from a card on multiplication may look as follows:

| 7×8 | 78 | 68 | 56 | 72 |
|---|---|---|---|---|

One row from a card on words may look as follows:

| turbid | provoked | muddy | worried | morose |
|---|---|---|---|---|

One row from a card on applied psychology may look as follows:

| Text on a real life problem | Action No. 1 | Action No. 2 | Action No. 3 | Action No. 4 |
|---|---|---|---|---|

It can also be appreciated that similar cards can be made for many other branches of knowledge such as foreign languages, code, history, etc.

From the above description, it can be seen that the present invention provides an educational device which permits a step-by-step presentation of material and a simultaneous check on comprehension. It can also be seen that the present invention provides an educational device which speeds up teaching and yet allows each student to move at his own rate for each problem presented. As can be appreciated from the above description, these objects are accomplished, at least in part, by the provision in the device of means for moving a further problem into view, said means being actuated by the selection of a correct answer to a previous problem.

While the invention has been illustrated and described in detail in the drawings and foregoing description, the same is to be considered as illustrative and not restrictive in character, it being understood that only the preferred embodiment has been shown and described. For example, the present embodiment might be modified so as to have a circular configuration. As a further alternative, the slots 22 might extend laterally of the device and the slots 26 might extend at an angle to the direction of movement of the card. It can be seen that various other configurations and modifications are possible within the scope of the invention and therefore, it should be understood that all changes and modifications that come within the spirit of the invention and the scope of the claims are also desired to be protected.

The invention claimed is:

1. An educational device comprising a housing, an element movable within said housing, a plurality of multiple choice problems carried by said element, said housing being proportioned to indicate a given problem and to hide further problems, said housing having a plurality of slots extending at an angle to the direction of movement, said element having a plurality of slots extending at an angle to the direction of movement and to the slots of said housing, each slot of said element being so arranged as to register with a respective one of said slots of said housing at changing portions along the length of the slots when said element moves, each slot of said element corresponding to one answer to one of said plurality of problems, the slots of said element corresponding to correct answers being longer than slots of said element corresponding to incorrect answers.

2. An educational device comprising a housing, a card movably mounted within said housing, said card carrying a plurality of multiple choice problems with the answers to said problems spaced across the card, said housing having an edge so located that said card may be moved with relation thereto to indicate a desired problem, said housing having a plurality of slots each of which is adjacent the edge and below a respective answer to the indicated problem, said card having slots corresponding to each answer to each problem, the slots of said card being arranged at an angle to the slots of said housing and located to receive a pointer projected through the slots of said housing, the slots of said card which correspond to a correct answer being longer than the slots of said card which correspond to an incorrect answer whereby a pointer may be moved through registering slots below a correct answer to move the card to indicate a new problem.

3. An educational device comprising a housing having spaced front and back walls, a card slidable in a direction upwardly and downwardly between said walls, said front wall having a plurality of slots arranged transversely thereacross and extending diagonally of said direction upwardly and rightwardly, said card having a plurality of slots arranged transversely thereacross, some of the slots of said card extending the same distance transversely of the device as the slots of said front wall and the rest of said slots of said card extending a relatively shorter distance transversely of the device, each of the slots of said card being capable of being aligned at its leftward end with the lower end of a respective one of the slots of said front walls.

4. Frame means for supporting in a viewing position an instruction card carrying a plurality of problem questions and associated sets of multiple-choice answers, each answer being identified with a perforation having a predetermined size and a predetermined location on said card, said frame means including spaced front and back walls adapted to slidably receive and pass an instruction card therebetween, said front wall having a viewing reference edge located so that an instruction card may be moved with relation thereto to expose to view at least one problem question and its associated set of multiple-choice answers, said front wall defining a plurality of slots, each extending at an angle to the direction of movement of said card and each being so arranged and spaced as to register with only one perforation identifying one answer to each problem question exposed to view.

5. An educational device comprising a housing, an element movable within said housing, said element carrying a plurality of problem questions along with a corresponding plurality of multiple-choice answer-sets, said housing being proportioned to expose a given problem and answer set to view and to conceal further problems, said housing having spaced front and back walls, said front wall defining a plurality of spaced slots, said element having a plurality of slots, each slot in said element corresponding to one answer to one of said plurality of problems, each slot of said element being spatially arranged so that at least a portion of each slot associated with an answer to a problem exposed to view registers with a portion of a corresponding slot in said housing, the slots in said element corresponding to correct answers having different dimensions than those slots corresponding to incorrect answers.

6. An educational device in acocrdance with claim 5 characterized in that the slots which correspond to a correct answer are longer than the slots which correspond to an incorrect answer.

References Cited in the file of this patent
UNITED STATES PATENTS

| | | |
|---|---|---|
| 2,221,303 | Shipley | Nov. 12, 1940 |
| 2,540,363 | Wister | Feb. 6, 1951 |
| 2,618,866 | Adams | Nov. 25, 1952 |
| 2,970,385 | Bringmann | Feb. 7, 1961 |